United States Patent [19]
Raybaud et al.

[11] Patent Number: 6,149,799
[45] Date of Patent: *Nov. 21, 2000

[54] CATALYST COMPROMISING A MIXED SULPHIDE AND ITS USE FOR HYDROREFINING AND HYDROCONVERTING HYDROCARBONS

[75] Inventors: Pascal Raybaud, Nice; Hervé Toulhoat, Houilles; Slavik Kasztelan, Rueil-Malmaison, all of France

[73] Assignee: Institut Francais du Petrole, Rueil Malmaison Cedex, France

[*] Notice: This patent is subject to a terminal disclaimer.

[21] Appl. No.: 09/007,049

[22] Filed: Jan. 14, 1998

[30] Foreign Application Priority Data

Jan. 15, 1997 [FR] France ................... 97 00443

[51] Int. Cl.⁷ ............ C10G 11/02; C10G 11/04; C10G 35/06; B01J 27/02; B01J 27/055

[52] U.S. Cl. ................ 208/49; 208/49; 208/108; 208/124; 208/133; 208/134; 208/137; 208/143; 208/208 R; 208/216 R; 208/217; 208/251 H; 208/245 H; 502/205; 502/206; 502/207; 502/208; 502/209; 502/210; 502/211; 502/212; 502/213; 502/214; 502/204; 502/202; 502/216; 502/218; 502/231

[58] Field of Search ............ 502/216, 218–231, 502/202, 204–214; 208/49, 108, 124, 133, 134, 137, 143, 208 R, 216 R, 217, 251 H, 254 H

[56] References Cited

U.S. PATENT DOCUMENTS

| | | |
|---|---|---|
| 4,007,135 | 2/1977 | Hayden et al. .............. 502/317 |
| 4,108,761 | 8/1978 | Sze et al. .................. 208/254 H |
| 4,171,258 | 10/1979 | Gaspar ..................... 208/144 |
| 4,491,639 | 1/1985 | Happel et al. ............... 502/219 |
| 4,595,672 | 6/1986 | Ho et al. ................... 502/219 |
| 4,740,491 | 4/1988 | Wise et al. ................. 502/216 |
| 4,824,820 | 4/1989 | Jacobson et al. ............ 502/219 |
| 4,945,078 | 7/1990 | Erekson et al. ............. 502/202 |
| 5,122,258 | 6/1992 | Eadie et al. ................ 208/112 |
| 5,173,468 | 12/1992 | Boehning et al. ............ 502/209 |
| 5,525,740 | 6/1996 | Rizkalla .................... 549/534 |
| 5,736,483 | 4/1998 | Rizkalla .................... 502/347 |
| 5,854,167 | 12/1998 | Rizkalla et al. ............. 502/216 |
| 5,905,053 | 5/1999 | Rizkalla et al. ............. 502/216 |

FOREIGN PATENT DOCUMENTS 0 181 082  5/1986  European Pat. Off. .

*Primary Examiner*—Mark L. Bell
*Assistant Examiner*—Patricia L. Hailey
*Attorney, Agent, or Firm*—Millen, White, Zelano & Branigan, P.C.

[57] ABSTRACT

The invention concerns a catalyst for hydrorefining and hydroconverting hydrocarbon feeds, comprising a mixed sulphide comprising at least two elements selected from elements with an atomic number selected from the group formed by the following numbers: 3, 11, 12, 19 to 33, 37, to 51, 55 to 83, 87 to 103, characterized in that the mixed sulphide results from a combination of at least one element the sulphide of which has a bond energy between the metal and sulphur of less than 50±3 kcal/mol (209±12 kJ/mol) and at least one element the sulphide of which has a bond energy between the metal and sulphur of more than 50±3 kcal/mol (209±12 kJ/mol), the mixed sulphide thus having a mean bond energy between the metal and sulphur which is in the range 30 to 70 kcal/mol (125 to 293 kJ/mol).

24 Claims, 2 Drawing Sheets

CATALYST COMPROMISING A MIXED SULPHIDE AND ITS USE FOR HYDROREFINING AND HYDROCONVERTING HYDROCARBONS

The present invention concerns a catalyst comprising a mixed sulphide comprising at least two elements selected from elements with an atomic number selected from the group formed by the following numbers 3, 11, 12, 19 to 33, 37 to 51, 55 to 83, 87 to 103, characterized in that the mixed sulphide results from a combination of at least one element the sulphide of which has a bond energy between the metal and sulphur of less than 50±3 kcal/mol (209±12 kJ/mol) and at least one element the sulphide of which has a bond energy between the metal and sulphur of more than 50±3 kcal/mol (209±12kJ/mol), the mixed sulphide thus having a mean bond energy between the metal and sulphur which is in the range 30 to 70 kcal/mol (125 to 293 kJ/mol).

The present invention also concerns the use of the mixed sulphide as a catalyst for hydrorefining and hydroconverting hydrocarbon feeds such as petroleum feeds, cuts originating from coal or hydrocarbons produced from natural gas, hydrocarbons prepared from the Fischer-Tropsch process, and more particularly for hydrogenation, hydrodenitrogenation, demercurisation, dearsenification, hydrodeoxygenation, hydrodearomatisation, hydrodesulphuration, hydrodemetalisation, hydrolsolmerisation, hydrodealkylation, hydrogenolysis, dehydrogenation and hydrocracking of hydrocarbon feeds containing aromatic compounds and/or olefinic compounds and/or naphthenic compounds and/or paraffinic compounds, the feeds optionally containing metals (for example nickel, vanadium, iron, mercury, arsenic) and/or nitrogen, and/or oxygen and/or sulphur.

Current catalytic hydrorefining processes use catalysts which can promote the principal reactions used to upgrade heavy cuts, in particular aromatic ring hydrogenation (HAR), hydrosulphuration (HDS), hydrodenitrogenation (HDN) and other hydroeliminations. Hydrorefining is used to treat feeds such as gasolines, gas oils, vacuum gas oils, and atmospheric or vacuum residues, deasphalted or otherwise. As an example, it is recommended for pre-treating feeds from catalytic cracking and hydrocracking processes At least one hydrorefining step is normally integrated into each of the known flow sheets for upgrading heavy petroleum cuts.

Catalysts used for hydrorefining and hydrocracking combine a large surface area support (generally 100 to 800 m²/g) with low superficial acidity and a hydrogenating function supplied by at least one metal from group VIB of the periodic table such as molybdenum or tungsten and/or at least one group VIII metal such as cobalt or nickel. These catalysts can also optionally contain at least one element selected from the group (P, Si, B, F).

It is now recognized that combining a group VIB metal such as molybdenum or tungsten and a non noble group VIII metal such as iron, cobalt or nickel as a sulphide corresponds to a mixed sulphide phase similar to combinations in a sulphide phase of elements of the following pairs: nickel-molybdenum, cobalt-molybdenum, iron-molybdenum, nickel-tungsten, cobalt-tungsten, and iron-tungsten, the activity of which is substantially higher for the different hydrorefining reactions than the activity of each of the sulphides of the metals cited above taken separately. Finding mixed sulphides with high activities for hydrorefining and hydroconversion reactions is thus important.

A number of mixed sulphides have been described, but such mixed sulphides have not necessarily been tested as a constituent of a catalyst for hydrorefining or hydroconversion of hydrocarbon feeds.

Figure 1:
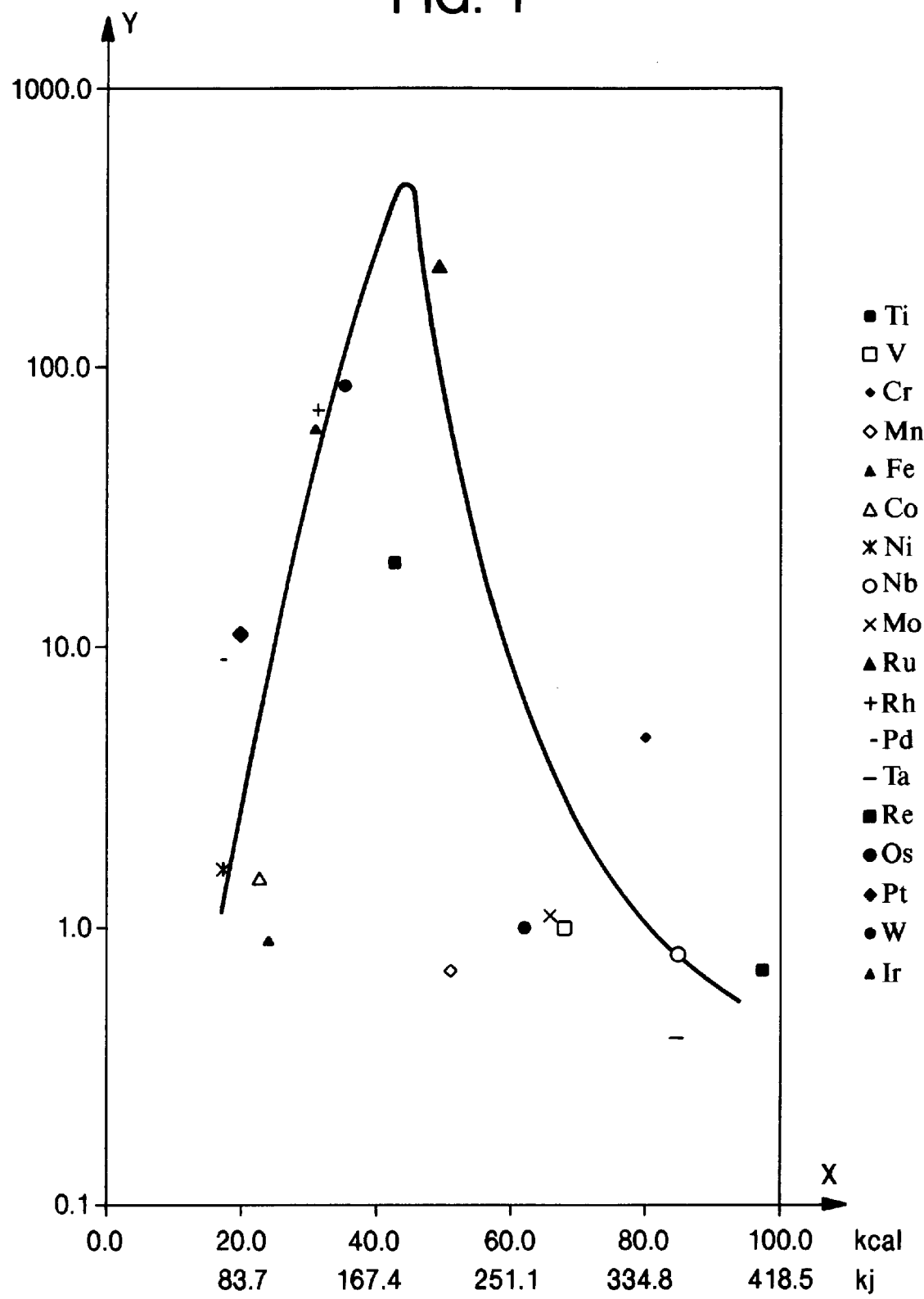
FIG. 1 shows, for different sulphides of metal M, the HDS activity as a function of standart heat of formation, as shown in Table 1.

Thus a certain number of simple sulphides, in particular transition metal sulphides, have been studied from the viewpoint of their catalytic properties and have been shown to be active for hydrorefining and hydroconversion reactions. As an example, the dibenzothiophene (DBT) hydrodesulphuration activity of massive sulphides of transition metals comprising an element with an atomic number which is selected from the group formed by the following numbers: 22 to 28, 40 to 46, 50, 73 to 79, was observed to have a maximum activity when such transition metal sulphides were classified in increasing standard heat of formation order as shown in Table 1 and FIG. 1, taken from T. A. Pecoraro, R. R. Chianelli, Journal of Catalysts, vol. 67, pages 430 to 445 (1981). Values for the standard heat of formation of metal sulphides are taken from "Thermodynamic Data for Inorganic Sulphides, Selenides and Tellurides" by K. C. Mills, Butterworths, London, 1974, and from the "Handbook of Chemistry and Physics", 76th Edition, 1995–1996, CRC Press. FIG. 1 ("Chianelli curve") shows, for different sulphides of metals M, a value of Y=HDS activity in $10^{16}$ molecules DBT/g sulphide/second, as a function of X=$-\Delta H°f$ standard in kcal/mol (kJ/mol) M where M is the metal. The curve was approximated from the points.

TABLE 1

| Metal | Sulphide $M_aS_b$ | $-\Delta H°f$ standard (kcal/mol) | (kJ/mol) | Activity HDS of DBT $10^{16}$ molecules/g/sec |
|---|---|---|---|---|
| Pd | PdS | 16.9 | 70.7 | 9.0 |
| Ni | $Ni_3S_2$ | 17.2 | 72.0 | 1.6 |
| Pt | PtS | 19.9 | 83.4 | 11.0 |
| Co | $Co_9S_8$ | 22.6 | 94.6 | 1.5 |
| Fe | FeS | 24.0 | 100.4 | 0.9 |
| Ir | $IrS_2$ | 31.0 | 129.7 | 67.0 |
| Rh | $Rh_2S_3$ | 31.4 | 131.4 | 70.0 |
| Os | $OsS_2$ | 35.3 | 147.7 | 85.0 |
| Re | $ReS_2$ | 42.7 | 178.7 | 20.0 |
| Ru | $RuS_2$ | 49.2 | 205.9 | 230.0 |
| Mn | MnS | 51.0 | 213.4 | 0.7 |
| W | $WS_2$ | 62.0 | 259.5 | 1.0 |
| Mo | $MoS_2$ | 65.8 | 275.4 | 1.1 |
| V | VS | 68.0 | 284.2 | 1.0 |
| Cr | $Cr_2S_3$ | 80.0 | 334.8 | 4.7 |
| Nb | $NbS_2$ | 84.6 | 354.0 | 0.8 |
| Ta | $TaS_2$ | 84.8 | 354.9 | 0.4 |
| Ti | $TiS_2$ | 97.3 | 407.2 | 0.7 |

The most active transition metal sulphides are ruthenium, osmium, rhodium and iridium sulphide. Maximum activity was obtained for an intermediate standard heat of formation of 50±3 kcal/mol (209±12 kJ/mol), interpreted as the need for a sulphide phase to have neither too strong nor too weak a bond energy between the metal and sulphur to obtain maximum activity. However, certain metal sulphides such as manganese, rhenium, chromium and tantalum do not comply with this rule inasmuch as, for example, the standard heat of formation of manganese sulphide, which is close to that of ruthenium sulphide, nevertheless does not produce a high hydrodesulphuration activity (see FIG. 1).

The high activity of nickel-molybdenum, cobalt-molybdenum, and nickel-tungsten combinations which are constituents in hydrotreatment catalysts which are known to the skilled person is thus explained by a combination of an element with a sulphide in which the standard heat of formation between the metal and sulphur is less than 50±3 kcal/mol (209±12 kJ/mol) (for example cobalt or nickel) and an element with a sulphide in which the standard heat of formation between the metal and sulphur is less than 50±3 kcal/mol (209±12 kJ/mol) (for example molybdenum or tungsten), in the form of a phase which thus has a standard heat of formation which is equal to the weighted mean of the heats of formation of the metal sulphides constituting the mixed phase taken separately, the phase having an intermediate standard heat of formation which results in a higher hydrodesulphuration activity value than the weighted mean of the hydrodesulphuration activities of the metal sulphides constituting the mixed phase taken separately [R. R Chianelli, T. A. Pecoraro, T. R. Halbert, W. H. Pun, E. I. Stiefel, J. Catal, Vol. 86, p. 226 (1984)]. This rule will now be termed "rule n°1" (or Chianelli rule).

Thus rule n°1 is verified for a certain number of known mixed sulphide phases such as cobalt-molybdenum, cobalt-tungsten, nickel-molybdenum, nickel-tungsten, iron-molybdenum, iron-tungsten, cobalt-ruthenium, nickel-ruthenium, cobalt-niobium, nickel-niobium.

Unfortunately, rule n°1, is not verified for certain mixed sulphides comprising a combination of at least two elements selected from elements with an atomic number which is selected from the group formed by the following numbers: 3, 11, 12, 19 to 33, 37 to 51, 55 to 83, 87 to 103, which have activities which are higher than the weighted mean of the activity of each of the two metal sulphides taken separately. This means that the skilled person cannot determine mixed sulphide phases with good hydrodesulphuration activity from rule n°1.

It thus appears that rule n°1 cannot predict the activity of combinations of certain metals and thus as a result, certain combinations of metals in a sulphide phase predicted not to be suitable using rule n°1 above could turn out to be active for hydrorefining reactions, and vice versa.

Without wishing to be bound by a particular theory, it appears that the particularly high activity of the mixed sulphide phases of the present invention are linked to the presence on the surface of the sulphide phase of a larger number of active sites as these are more easily generated when the mean bond energy between the metal and sulphur is in the range 30 to 70 kcal/mol (125 to 293 kJ/mol), thus improving the hydrogenation, hydrodesulphurating, hydrodenitrogenating, hydrogenolysing and cracking properties with respect to the activity of each metal sulphide taken separately.

The characteristic parameter used to determine the importance of a new mixed phase is thus not the standard heat of formation but a mean bond energy of the bond between the metal and sulphur. A new rule n°2 can be defined which indicates that a mixed sulphide comprising at least two elements with an atomic number selected from the group formed by the following numbers: 3, 11, 12, 19 to 33, 37 to 51, 55 to 83, 87 to 103, in which at least one element has a sulphide with a bond energy between the metal and sulphur of less than 50±3 kcal/mol (209±12 kJ/mol) and at least one element has a sulphide with a bond energy between the metal and sulphur of more than 50±3 kcal/mol (209±12 kJ/mol), has a high hydrogenation, hydrodenitrogenation and hydrodesulphuration activity which is also higher than the weighted mean of the activities of the metal sulphides from which it is formed taken separately when the mean bond energy between the metal and sulphur of the combination of metals in a sulphide phase is in the range 39 kcal/mol (163 kJ/mol) to 61 kcal/mol (255 kJ/mol). This rule will now be termed rule n°2. It constitutes one of the essential characteristics of the invention.

The mean bond energy between the metal and sulphur ($E_{M-S}$) for a sulphide with composition $M_aS_b$ containing no sulphur—sulphur bonds can be determined using the following relationship number 1:

$$E_{M-S} = \frac{-[(a\Delta H°f - a\Delta H°sub(M_{solid}) - b\Delta H°sub(S_{solid})) + (a+b)RT]*m}{n}$$

where:
—$\Delta H°sub(M_{solid})$ is the standard heat of sublimation of the metal (in kcal/mol or kJ/mol);
—$\Delta H°sub(S_{solid})$ is the standard heat of sublimation of sulphur (in kcal/mol or kJ/mol);
—$\Delta H°f$ is the standard heat of formation of the sulphide (in kcal/mol or kJ/mol of metal); —n: number of bonds between the metal and sulphur per crystallographic cell of the Bravais lattice;
—m: number of stoichiometric units of sulphide per crystallographic cell of the Bravais lattice;
—R: perfect gas constant: R=0.001985 kcal (0.01 kJ)/mol/degree Kelvin;
—T is the temperature; T=298.15 degrees Kelvin.

This value of the mean bond energy between the metal and sulphur per crystallographic cell of the mixed sulphide phase is linked to the enthalpies of formation of crystals by a Born-Haber cycle.

In addition to bonds between the metal and sulphur, certain sulphurides contain bonds between two sulphur atoms. In this case, the mean bond energy between the metal and sulphur ($E_{M-S}$) for a sulphide with composition $M_aS_b$ containing sulphur—sulphur bonds can be determined using the following relationship number 2:

$$E_{M-S} = \frac{-[(a\Delta H°f - a\Delta H°sub(M_{solid}) - b\Delta H°sub(S_{solid})) + (a+b)RT - pE_{S-S}]*m}{n}$$

where:
—$\Delta H°sub(M_{solid})$ is the standard heat of sublimation of the metal (in kcal/mol or kJ/mol).
—$\Delta H°sub(S_{solid})$ is the standard heat of sublimation of sulphur (in kcal/mol of kJ/mol);
—$\Delta H°f$ is the standard heat of formation of the sulphide (in kcal/mol or kJ/mol of metal);
—n: number of bonds between the metal and sulphur per crystallographic cell of the Bravais lattice;
—m: number of stoichiometric units of sulphide per crystallographic cell of the Bravais lattice;
—p: number of S—S bonds per crystallographic cell of the Bravais lattice;
—R: perfect gas constant; R=0.001985 kcal (0.01 kJ)/mol/degree Kelvin;
—T is the temperature; T=298.15 degrees Kelvin;
—$E_{S-S}$=33 kcal/mol (138 kJ/mol).

The values of the standard heat of sublimation of the metal ($\Delta H°sub(M_{solid})$), the standard heat of sublimation of sulphur ($\Delta H°sub$ ($S_{solid}$)), are taken from the "Handbook of Chemistry and Physics", $76^{th}$ edition, 1995–1996, CRC Press. The standard heat of formation values of metal sulphides ($\Delta H°f$) are taken from "Thermodynamic Data for Inorganic Sulphides, Selenides and Tellurides", K. C. Mills, Butterworths, London, 1974 and T. A. Pecoraro, R. R. Chianelli, Journal of Catalysis, vol. 67, pages 430 to 445 (1981).

The values of n, the number of bonds between the metal and sulphur per crystallographic cell of the Bravais lattice, and m the number of stoichiometric units of sulphide per crystallographic cell, are obtained from a graphical representation of the elementary cell of the sulphide crystal such as that available from the ICDS database (Inorganic Crystal Structure database, version 2.0, February 95, Gmelin Institut fur Anorganische Chemie und Forschinformations Zentrum, Karlsruhe, Germany). The graphical representation can be constructed on a computer screen using, for example, the "Solid Builder" module in "Insight-II" software distributed by Molecular Simulations Inc., (9685 Scranton Road, San Diego, Calif. USA, 92121-3759). A chemical bond is considered to exist between two atoms of an elementary cell in a Bravais lattice when the distance between the two atoms is less than 0.275 nanometers.

Table 2 shows data and hydrodesulphuration activities for sulphides, now classified in increasing metal to sulphur bond energy order.

was approximated from the points. It can also be seen that the relative position of the different simple sulphides is different to that obtained when classified according to the standard heat of formation of Table 1 and FIG. 1. As a result, if a rule is applied which consists of attributing a mean bond energy to a combination of metals in a sulphide phase by taking the weighted mean of the bond energies of each of the metal sulphides taken separately, it can be seen that combinations of elements in a sulphide phase different to the combinations envisaged by the preceding method using standard heats of formation, or rule n°,1 will have a high activity for hydrorefining reactions.

The present invention concerns a catalyst comprising a mixed sulphide combining metals and sulphur, the mixed sulphide comprising at least two elements selected from elements with an atomic number selected from the group formed by the following numbers: 3, 11, 12, 19 or 33, 37, to 51, 55 to 83, 87 to 103, characterized in that the mixed sulphide results from a combination of at least one element the sulphide of which has a bond energy between the metal and sulphur of less than 50±3 kcal/mol (200±12 kJ/mol), and at least one element the sulphide of which has a bond energy between the metal and sulphur of more than 50±3 kcal/mol (209±12 kJ/mol), the mixed sulphide thus having a mean bond energy between the metal and sulphur which is in the range 30 to 70 kcal/mol (125 to 293 kJ/mol).

TABLE 2

| Element | $\Delta H°sub$ standard | | Sulphide $M_aS_b$ | n | m | p | $-\Delta H°f$ standard | | $E_{M-S}$ | | Activity HDS of DBT $10^{16}$ |
| | kcal/mol | kJ/mol | | | | | kcal/mol | kJ/mol | kcal/mol | kJ/mol | molecules/g/sec |
| --- | --- | --- | --- | --- | --- | --- | --- | --- | --- | --- | --- |
| S | 66.64 | 278.89 | | | | | | | | | |
| Mn | 67.10 | 280.81 | MnS | 6 | 1 | 0 | 51.0 | 213.2 | 30.8 | 128.9 | 0.7 |
| Fe | 99.43 | 416.11 | FeS | 6 | 1 | 0 | 24.0 | 100.4 | 31.7 | 132.6 | 0.9 |
| Ni | 102.63 | 429.51 | $Ni_3S_2$ | 12 | 1 | 0 | 17.2 | 71.9 | 41.1 | 172.0 | 1.6 |
| V | 122.90 | 514.34 | VS | 12 | 2 | 0 | 68.0 | 284.2 | 42.9 | 179.5 | 1.0 |
| Co | 101.50 | 424.78 | $Co_9S_8$ | 38 | 1 | 0 | 22.6 | 94.5 | 43.4 | 181.6 | 1.5 |
| Pd | 90.40 | 378.32 | PdS | 32 | 8 | 0 | 16.9 | 70.6 | 43.5 | 182.0 | 9.0 |
| Rh | 133.10 | 557.02 | $Rh_2S_3$ | 48 | 4 | 0 | 31.4 | 131.2 | 44.1 | 184.6 | 70.0 |
| Cr | 94.80 | 396.74 | $Cr_2S_3$ | 24 | 2 | 0 | 80.0 | 334.8 | 45.8 | 191.7 | 4.7 |
| Ru | 153.60 | 642.82 | $RuS_2$ | 24 | 4 | 4 | 49.2 | 205.9 | 50.5 | 211.3 | 230.0 |
| Os | 189.00 | 790.97 | $OsS_2$ | 24 | 4 | 4 | 35.3 | 147.5 | 54.5 | 228.0 | 85.0 |
| Ir | 165.00 | 690.53 | $IrS_2$ | 6 | 1 | 0 | 31.0 | 129.6 | 54.9 | 229.8 | 67.0 |
| Pt | 135.10 | 564.93 | PtS | 8 | 2 | 0 | 19.9 | 83.3 | 55.4 | 231.9 | 11.0 |
| Ti | 112.97 | 472.78 | $TiS_2$ | 6 | 1 | 0 | 97.3 | 407.2 | 57.3 | 239.8 | 0.7 |
| Mo | 157.30 | 658.30 | $MoS_2$ | 12 | 2 | 0 | 65.8 | 275.0 | 59.4 | 248.6 | 1.1 |
| Re | 183.89 | 769.58 | $ReS_2$ | 24 | 4 | 0 | 42.7 | 178.7 | 60.0 | 251.1 | 20.0 |
| Ta | 186.78 | 781.67 | $TaS_2$ | 6 | 1 | 0 | 84.6 | 354.0 | 64.4 | 269.5 | 0.4 |
| Nb | 173.38 | 725.60 | $NbS_2$ | 6 | 1 | 0 | 84.8 | 354.9 | 65.2 | 272.9 | 0.8 |
| W | 203.00 | 849.56 | $WS_2$ | 12 | 2 | 0 | 62.0 | 259.5 | 66.4 | 277.9 | 1.0 |

Figure 2:
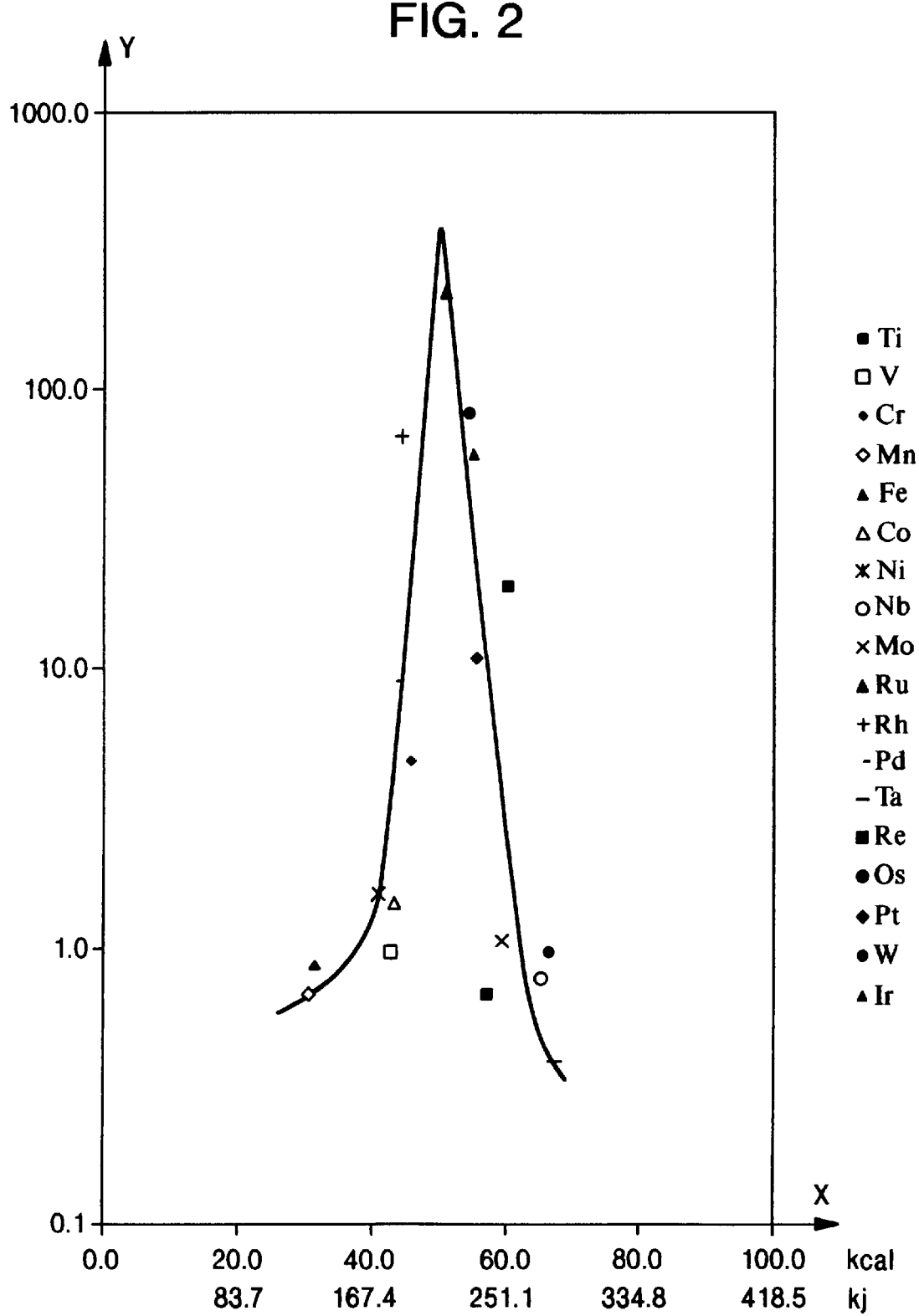
FIG. 2 shows, for different values of metal M, the HDS activity as a function of bond energy, as shown in Table 2.

Classification of these different transition metal sulphides in increasing bond energy between the metal and sulphur order as shown in Table 2 is different from the classification obtained using increasing heat of formation of Table 1. When the dibenzothiophene HDS activity measured by T. A. Pecoraro and R. R. Chianelli, Journal of Catalysis, vol. 67, pages 430 to 445 (1981) is shown as a function of the bond energy between the metal and sulphur, a curve with a maximum is observed, now with all of the sulphides placed correctly on the curve (FIG. 2). FIG. 1 (IFP curve) shows, for different values of M, the value Y=HDS activity in $10^{16}$ molecules DBT/g sulphide/second as a function of X'=—BE (bond energy) M–S in kcal (kJ)/mol of M–S bond where M is the metal. The curve The catalyst can further comprise a porous matrix, generally an amorphous or low crystalline oxide. The catalyst also optionally comprises a zeolite, for example a Y molecule with faujasite structure. The catalyst can also optionally comprise at least one element selected from the elements P, B and Si. Finally, the catalyst can comprise at least one element from group VIIA of the periodic table ("Handbook of Chemistry and Physics", $76^{th}$ edition, 1995–1996, inside front cover), preferably fluorine.

The mixed sulphide comprised in the catalyst of the invention generally comprises at least one element selected from the group formed by platinum, iridium, osmium, rhenium, ruthenium, tungsten, molybdenum, tantalum, niobium and titanium, and at least one element selected from the group formed by palladium, nickel, cobalt, iron, rhodium, ruthenium, manganese, vanadium and chromium.

In particular, for elements from Table 2, the mixed sulphides in the catalyst of the invention generally comprises at least one combination of sulphur and the following metals.
platinum-palladium;
platinum-nickel;
platinum-cobalt;
platinum-iron;
platinum-rhodium;
platinum-manganese;
platinum-vanadium;
platinum-chromium;
platinum-ruthenium;
osmium-palladium;
osmium-nickel;
osmium-cobalt;
osmium-iron;
osmium-rhodium;
osmium-manganese;
osmium-vanadium;
osmium-chromium;
osmium-ruthenium;
rhenium-palladium;
rhenium-nickel;
rhenium-cobalt;
rhenium-iron;
rhenium-rhodium;
rhenium-manganese;
rhenium-vanadium;
rhenium-chromium;
rhenium-ruthenium;
rhenium-palladium;
ruthenium-nickel;
ruthenium-cobalt;
ruthenium-iron;
ruthenium-rhodium;
ruthenium-manganese;
ruthenium-vanadium;
ruthenium-chromium;
tungsten-palladium;
tungsten-nickel;
tungsten-cobalt;
tungsten-iron;
tungsten-rhodium;
tungsten-manganese;
tungsten-vanadium;
tungsten-chromium;
tungsten-ruthenium;
molybdenum-palladium;
molybdenum-nickel;
molybdenum-cobalt;
molybdenum-iron;
molybdenum-rhodium;
molybdenum-manganese;
molybdenum-vanadium;
molybdenum-chromium;
molybdenum-ruthenium;
tantalum-palladium;
tantalum-cobalt;
tantalum-iron;
tantalum-rhodium;
tantalum-manganese;
tantalum-vanadium;
tantalum-chromium;
tantalum-ruthenium;
niobium-palladium;
niobium-nickel;
niobium-cobalt;
niobium-iron;
niobium-rhodium;
niobium-manganese;
niobium-vanadium;
niobium-chromium;
niobium-ruthenium;
titanium-palladium;
titanium-nickel;
titanium-cobalt;
titanium-iron;
titanium-rhodium;
titanium-manganese;
titanium-vanadium;
titanium-chromium;
titanium-ruthenium;
iridium-palladium;
iridium-nickel;
iridium-cobalt;
iridium-iron;
iridium-rhodium;
iridium-manganese;
iridium-vanadium;
iridium-chromium;
iridium-ruthenium.

The mixed sulphide comprised in the catalyst of the invention generally does not comprise at least one combination of sulphur and the following metals:
ruthenium-nickel, known;
ruthenium-cobalt, known;
tungsten-nickel, known;
tungsten-cobalt, known;
tungsten, iron, known;
molybdenum-nickel, known;
molybdenum-cobalt, known;
molybdenum-iron, known.

The mixed sulphide comprised in the catalyst of the invention preferably does not contain at least one combination of sulphur and the following metals:
ruthenium-nickel;
ruthenium-cobalt;
tungsten-nickel;
tungsten-cobalt;
tungsten-iron;
molybdenum-nickel;
molybdenum-cobalt;
molybdenum-iron;
molybdenum-vanadium;
niobium-nickel;
niobium-cobalt.

The mixed sulphide comprised in the catalyst of the invention can also contain an association of sulphur with at least three metals, preferably chosen among the combinations D1+D2+G1 or D1+G1+G2, in which D1 is different from D2, and G1 is different from G2, D1, D2 and G1, G2 being chosen among the elements which have an atomic number in the group constituted by the following numbers: 3, 11, 12, 19 to 33, 37 to 51, 55, to 83, 87 to 103.

Preferably D1, and D2 are different and chose among the following metals: platinum, iridium, osmium, rhenium, ruthenium, tungsten, molybdenum, tatalum, niobium, titanium.

Preferably, G1 and G2 are different and chosen among the following metals: palladium, nickel, cobalt, iron, rhodium, manganese, vanadium, chromium.

In general, the mean bond energy between the metal and sulphur of the mixed sulphide in the catalyst of the invention, defined as the arithmetic mean of the bond energies of simple stable sulphides or rule n°2 as defined above, is in the range 30 to 70 kcal/mol (125 to 293 kJ/mol), preferably in the range 35 to 65 kcal/mol (146 to 272 kJ/mol), more preferably in the range 39 to 61 kcal/mol (163 to 255 kJ/mol).

The mixed sulphide comprised in the catalyst of the invention can form part of the composition of a catalyst which may be in its supported form, i.e., it comprises a matrix which acts as a support in particular, or it can be in its massive form, i.e., it does not comprise a matrix.

The mixed sulphide present in the catalyst of the invention is characterized by the following approximate general formula:

$$MS_x$$

where:
M is a combination of at least two elements selected from elements with an atomic number which is selected from the group formed by the following numbers: 3, 11, 12, 19 to 33, 37 to 51, 55 to 83, 87 to 103;
S is sulphur;
x is a number in the range 0 to 6, preferably 0.01 to 5.5, more preferably in the range 0.05 to 5.

The massive catalyst of the present invention generally comprises, in % by weight with respect to the total catalyst mass:
0.1% to 100%, preferably 0.5% to 100%, more preferably 1% to 100%, of a mixed sulphide comprising at least two elements selected from elements with an atomic number which is selected from the group formed by the following numbers: 3, 11, 12, 19 to 33, 37 to 51, 55 to 83, 87 to 103;
the catalyst possibly further containing:
0 to 30%, preferably 0 to 20%, more preferably 2 to 15%, of at least one element selected from the group formed by elements Si, P and B; and
0 to 15%, preferably 0 to 10%, more preferably 2 to 8%, of at least one element selected from group VIIA, preferably fluorine.

The supported catalyst of the present invention generally comprises, in % by weight with respect to the total catalyst mass:
1% to 99.9%, preferably 5% to 99.5%, more preferably 10% to 99%, of at least one support;
0.1% to 99%, preferably 0.5% to 95%, more preferably 1% to 90%, of a mixed sulphide comprising at least two elements selected from elements with an atomic number which is selected from the group formed by the following numbers: 3, 11, 12, 19 to 33, 37 to 51, 55 to 83, 87 to 103;
the catalyst possibly further containing:
0 to 95%, preferably 0 to 85%, more preferably 0 to 80%, of at least one porous matrix;
0 to 80%, preferably 0 to 70%, more preferably 0 to 60%, of at least one zeolite, for example a Y zeolite with faujasite structure, in its hydrogen form;
and optionally again:
0 to 20%, preferably 0 to 15%, more preferably 2 to 12%, of at least one element selected from the group formed by elements Si, P and B; and
0 to 30%, preferably 0 to 20%, more preferably 0 to 10%, and most preferably 2 to 8%, of at least one element selected from group VIIA, preferably fluorine.

The mixed sulphide comprised in the catalyst of the invention can be synthesised using any method known to the skilled person.

The supported catalyst of the invention can be prepared using any method which is known to the skilled person. It is normally obtained by impregnating the matrix with a solution of the constituent elements of the active phase. The matrix is first formed and calcined before impregnation. It can be formed, for example, by extrusion, pelletization, by oil-drop, by rotating plate granulation or using any other method which is known to the skilled person.

The pre-formed matrix is then usually calcined in air, normally at a temperature of at least 400° C., generally about 500° C. to 1000° C. The matrix is preferably impregnated using a dry impregnating process which is known to the skilled person. Impregnation can be carried out in a single step using a solution containing all of the constituent elements of the final catalyst.

The catalyst of the invention can also be formed by mixing powders containing all of the constituent elements of the finished catalyst and forming, for example by extrusion, pelletization, by oil-drop, rotating plate granulation or any other method which is known to the skilled person.

The mixed sulphide containing a combination of at least two elements with an atomic number selected from the group formed by the following numbers: 3, 11, 12, 19 to 33, 37 to 51, 55 to 83, 87 to 103, also the heteroelement X selected from the group formed by P, B and Si and the anion from group VIIA, can be introduced into the catalyst at various stages in the preparation and in various manners.

Combination in a mixed sulphide of at least two elements the atomic number of which is selected from the group formed by the following numbers: 3, 11, 12, 19 to 33, 37 to 51, 55 to 83, 87 to 103, can be introduced partially or completely on mixing the porous matrix.

The optional element selected from the group formed by Si, P, B and the optional anion from group VIIA can be introduced by means of at least one ion exchange operation carried out on the calcined support constituted by a mixed sulphide dispersed in the selected matrix, using a solution containing at least one precursor salt of elements Si, P, b and anions from group VIIA.

When the metals are introduced in a plurality of steps for impregnating the corresponding precursor salts, an intermediate catalyst drying step is generally carried out at a temperature which is in the range 60° C. to 250° C.

Compounds containing at least one element with an atomic number which is selected from the group formed by the following numbers: 3, 11, 12, 19 to 33, 37 to 51, 55 to 83, 87 to 103, include oxides, hydroxides, oxyhydroxides, acids, polyoxometallates, alkoxides with formula $M(OR_1)_x$ where $R_1$ is an alkyl radical and x is generally in the range 2 to 6, oxalates, ammonium salts, nitrates, carbonates, hydroxycarbonates, carboxylates, halides, oxyhalides, phosphates, hydrides, nitrides, borides, carbides, phosphides, oxysulphides, oxynitrides, oxycarbides, oxynitrates, carbonyl complexes, cyclopentadienyl complexes, carbamates, thiocarbamates, carboxylates, xanthates, thioxanthates, acetylacetonates, thiometallates, thiophosphates, thiophosphinates, and thiosalts, in particular ammonium salts. Oxides, nitrates, halides and salts of transition metals, lanthanides and actinides are preferred.

Alkaline and alkaline-earth compounds include oxides, hydroxides, oxyhydroxides, oxalates, ammonium salts, nitrates, carbonates, hydroxycarbonates, carboxylates, halides, oxyhalides, phosphates, sulphides, oxysulphides, and oxynitrates. Nitrates and carbonates are preferred.

The preferred phosphorous source is phosphoric acid $H_3PO_4$, but salts and esters such as alkaline phosphates, ammonium phosphates, gallium phosphates or alkyl phosphates are also suitable. Phosphorous acids, for example hypophosphorous acid, phosphomolybdic acid and its salts, and phosphotungstic acid and its salts can also advantageously be used. Phosphorous can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used: a hydrogel, an aerogel or a colloidal suspension, precipitation oxides, oxides from ester hydrolysis such as ethyl orthosilicate $Si(OEt)_4$, siloxanes, or silicates of halides such as ammonium fluorosilicate $(NH_4)_2SiF_6$ or sodium fluorosilicate $Na_2SiF_6$. Silicomolybdic acid and its salts, or silicotungstic acid and its salts can also advantageously be used. Amorphous silicates, for example of aluminium, phosphorous, mesoporous silicates, and crystalline silicates such as alkaline or alkaline-earth silicates, or transition metal silicates such as cobalt or nickel silicates, can also be used.

The boron source can be an amorphous borate such as boric acid, preferably orthoboric acid $H_3BO_3$, ammonium biborate or pentaborate, boron oxide, or boric esters with formula $B(OR)_3$ and $HB(OR)_2$ in which R is a hydrocarbon residue normally with 1 to 50 carbon atoms and which may comprise heteroatoms in its chain or as a substituent on the chain. Examples of hydrocarbon residues are methyl, ethyl, propyl, butyl, pentyl, heptyl and octyl radicals. Aluminium borate, phosphorous borate and crystallised borates such as borosilicates can also be used. Groups R in the above formula can be identical or different. Boron can, for example, be introduced using a solution of boric acid in an alcohol.

Sources of group VIIA elements which can be used are known to the skilled person. As an example, fluoride ions can be introduced in the form of hydrofluoric acid or its salts. These salts are of alkaline metals, ammonium salts or salts of an organic compound. In the latter case, the salt is advantageously formed in the reaction mixture by reaction between the organic compound and hydrofluoric acid. Hydrolysable compounds which can liberate fluoride anions into the water can also be used, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating with an aqueous solution of hydrofluoric acid or ammonium fluoride. The chloride anions can be introduced in the form of hydrochloric acid, or its salts. These salts are formed with alkaline metals, ammonium or an organic compound. In the latter case, the salt is advantageously formed in the reaction mixture by reaction between the organic compound and hydrochloric acid.

The catalyst of the invention generally also comprises at least one porous mineral matrix, which is normally amorphous or of low crystallinity. The matrix is normally selected from the group formed by alumina, silica, silica-alumina, magnesia, titanium oxide or zirconium oxide, lanthanum oxide, cerium oxide, aluminium phosphates, boron phosphates, or a mixture of at least two of the oxides cited above, and combinations of alumina and boron oxide, mixtures of alumina and titanium oxide, alumina and zirconia and titanium oxide and zirconia. Aluminates can also be selected, for example magnesium, calcium, barium, manganese, iron, cobalt, nickel, copper and zinc aluminates, and mixed aluminates, for example those containing at least two of the metals cited above. Titanates can also be selected, for example zinc, nickel or cobalt titanates. Matrices containing alumina are preferred, in all of the forms known to the skilled person, for example gamma alumina. Mixtures of alumina and silica and mixtures of alumina and boron oxide can also be used.

In addition to at least one of the compounds cited above, the matrix can also comprise at least one simple synthetic or natural 2:1 dioctahedral phyllosilicate or 3:1 trioctahedral phyllosilicate type clay such as kaolinite, antigorite, chrysotile, montmorillonite, bejdellite, vermiculite, talc, hectorite, saponite, or laponite. These clays can also be dealuminated.

Mixtures of alumina and clay and mixtures of silica-alumina and clay can also advantageously be used.

In addition to at least one of the compounds cited above, the matrix can also comprise at least one compound selected from the group formed by crystalline aluminosilicate or synthetic or natural zeolite type molecular sieves such as Y zeolite, fluorinated Y zeolite, Y zeolite containing rare earths, X zeolite, Y zeolite containing alkaline or alkaline-earth ions, L zeolite, beta zeolite, small-pore mordenite, large-pore mordenite, omega zeolite, Nu-10, ZSM-22, Nu-86, Nu-87, and ZSM-5 zeolite.

Mixtures of alumina and zeolite and mixtures of silica-alumina and zeolite can also advantageously be used.

Preferred zeolites are those with a silicon/aluminium (Si/Al) framework atomic ratio of more than about 3:1. Faujasite structure zeolites are advantageously used, in particular stabilised Y zeolites and ultrastabilised USY zeolites, either at least partially exchanged with metal cations, for example alkaline or alkaline-earth metal cations and/or cations of rare earth metals with atomic number 57 to 71 inclusive, or in the hydrogen form ("Zeolite Molecular Sieves: Structure, Chemistry and Used", D. W. Breck, J. Wiley and Sons, 1973).

In addition to at least one of the compounds cited above, the porous matrix can also comprise at least one compound selected from the group formed by non zeolitic crystalline molecular sieves such as mesoporous silicas, silicalite, silicoaluminophosphates, aluminophosphates, ferrosilicates, titanium silicoaluminates, borosilicates, chromosilicates and transition metal aluminophosphates (including cobalt).

In addition to at least one of the compounds cited above, the porous matrix can also comprise at least one phosphorous compound such as amorphous phosphates, for example of aluminium, boron, or transition metals, and natural or synthetic crystalline phosphates in particular aluminophosphates.

Impregnation of elements into the matrix can be facilitated by adding phosphoric acid to the solutions, which thus also introduces phosphorous and promotes catalytic activity. Other phosphorous compounds can be used, as is well known to the skilled person.

Impregnation of elements into the matrix can also be facilitated by adding hydrogen peroxide, as is well known to the skilled person.

The invention also concerns a process for hydrorefining or hydrocracking hydrocarbon feeds, characterized in that it comprises the use of a catalyst of the invention to treat or pre-treat the feeds. In the process, at least one of the following operations is carried out: hydrogenation, hydrodenitrogenation, hydrodeoxygenation, demercurisation, dearsenification, hydrodearomatisation, hydrodesulphuration, hydrodemetallisation, hydroisomerisation, hydrodealkylation, hydrogenolysis, dehydrogenation and hydrocracking of hydrocarbon feeds containing aromatic compounds and/or olefinic compounds and/or naphthenic compounds and/or paraffinic compounds.

The catalyst of the invention can advantageously be used to pre-treat catalytic cracking feeds and in the first step of mild hydroconversion or hydrocracking. It is thus normally used in combination with an acidic zeolitic or non zeolitic catalyst for the second treatment step.

The feeds used for the process of the invention are petroleum cuts used alone or as a mixture, such as gasolines, gas oils, vacuum gas oils, atmospheric residues, vacuum residues, atmospheric distillates, vacuum distillates, heavy fuels, oils, waxes and paraffins, spent oils, deasphalted crudes or residues and feeds originating from thermal or catalytic conversion processes such as cuts from coal, hydrocarbons produced from natural gas, or hydrocarbons produced from the Fischer-Tropsch synthesis. These feeds normally comprise at least one heteroatom such as sulphur, oxygen or nitrogen and/or at least one metal.

The operating conditions used in the process of the invention are very variable, depending on the nature of the feed, the quality of the desired products and the installations available to the refiner. They are generally as follows: the temperature is more than 100° C., normally in the range of 150° C. to 480° C., the pressure is more than 0.05 MPa, normally more than 1 MPa, the hydrogen recycle rate is a minimum of 50 and usually in the range of 50 to 5000 normal liters of hydrogen per liter of feed, and the hourly space velocity is in the range of 0.1 to 20 volumes of feed per volume of catalyst per hour.

The process of the invention is preferably such that the catalyst undergoes prior sulphurisation so as to transform at least part of the metallic species to the sulphide before coming into contact with the feed to be treated. This sulphurisation activation treatment is well known to the skilled person and can be carried out using any method which has been described in the literature.

The following examples illustrate the present invention without in any way limiting its scope.

List of catalysts in the Examples:

| Catalyst | |
|---|---|
| A1 | V |
| A2 | Pd |
| A3 | V-Pd |
| B1 | Ni |
| B2 | Pt |
| B3 | Ni-Pt |
| C1 | Ru |
| C2 | V-Ru |
| D1 | Ni-Mo (comparative) |
| D2 | Co-Mo (comparative) |

EXAMPLE 1
Preparation of an Alumina Support Forming Part of the Composition of the Catalysts of the Invention We produced a large quantity of an alumina based support so that the catalysts described below could be prepared from the same formed support. We used a matrix composed of ultrafine tabular boehmite or alumina gel SB3 sold by Condéa Chemie GmbH. This gel was mixed with an aqueous solution containing 66% nitric acid (7% by weight acid per gram of dry gel) then mixed for 15 minutes. Following mixing, the paste obtained was passed through a die having cylindrical orifices with a diameter of 1.3 mm. The extrudates were dried overnight at 120° C. then calcined at 550° C. for 2 hours in moist air containing 7.5% by volume of water. 1.2 mm diameter cylindrical extrudates were obtained which had a specific surface area of 243 m$^2$/g, a pore volume of 0.61 cm$^3$/g and a uni-modal pore size distribution centred on 100 Å. Analysis of the matrix using X ray diffraction showed it to be composed solely of low crystallinity cubic gamma alumina.

EXAMPLE 2
Preparation of Catalysts Containing Pd and V (Not in Accordance with the Invention)

We produced catalysts containing vanadium alone, palladium alone and vanadium and palladium supported on the support described in Example 1. Catalyst A1 was prepared by adding vanadium to the extruded support by dry impregnation in an aqueous medium using ammonium metavanadate $V_{12}O_{40} \cdot nH_2O$ as a precursor. After dry impregnation, the extrudates were dried overnight at 80° C. then calcined in dry air for 2 hours at 500° C. Catalyst A1 obtained contained 0.5 vanadium atoms per nm$^2$ of support surface, i.e., 1.02 grams of elemental vanadium per 100 grams of support.

Catalyst A2 was prepared by adding palladium to the extruded support of Example 1 by dry impregnation in an aqueous medium using palladium nitrate $Pd(NO_3)_2 \cdot nH_2O$ as a precursor. After dry impregnation, the extrudates were dried overnight at 80° C. then calcined in dry air for 2 hours at 500° C. Catalyst A2 obtained contained 0.5 palladium atoms per nm$^2$ of support surface, i.e., 2.12 grams of elemental palladium per 100 grams of support.

Catalyst A3 was prepared by adding palladium to catalyst A1 containing vanadium by dry impregnation in an aqueous medium using palladium nitrate $Pd(NO_3)_2 \cdot nH_2O$ as a precursor. After dry impregnation, the extrudates were dried overnight at 80° C. then calcined in dry air for 2 hours at 500° C. Catalyst A3 obtained contained 0.5 palladium atoms per nm$^2$ of support surface and 0.5 vanadium atoms per nm$^2$ of support surface, i.e., 2.12 grams of elemental palladium per 100 grams of support and 1.02 grams of elemental vanadium per 100 g of support. The molar proportion of vanadium with respect to the total of vanadium and palladium was 0.5. The catalyst thus contained the combination $V_{0.5}Pd_{0.5}$.

The catalysts prepared as above were sulphurised in an autoclave under autogenous pressure in the presence of $CS_2$. 20 ml of $CS_2$ per 100 g of catalyst was added to the autoclave, it was sealed then heated to 400° C. for 10 hours. The internal pressure was about 4 MPa.

EXAMPLE 3
Preparation of Catalysts Containing Pt and Ni (In Accordance with the Invention)

We produced a series of catalysts containing platinum alone, nickel alone and platinum and nickel supported on the support described in Example 1. Catalyst B1 was prepared by adding nickel to the extruded support by dry impregnation in an aqueous medium using nickel nitrate $Ni(NO_3)_2 \cdot 6H_2O$ as a precursor. After dry impregnation, the extrudates were dried overnight at 80° C. then calcined in dry air for 2 hours at 500° C. Catalyst B1 obtained contained 0.5 nickel atoms per nm$^2$ of support surface, i.e., 1.17 grams of elemental nickel per 100 grams of support.

Catalyst B2 was prepared by adding platinum to the extruded support by dry impregnation in an aqueous medium using chloroplatinic acid $H_2PtCl_6 \cdot nH_2O$ as a precursor. After dry impregnation, the extrudates were dried overnight at 80° C. then calcined in dry air for 2 hours at 500° C. Catalyst B2 obtained contained 1.2 platinum atoms per $nm^2$ of support surface, i.e., 9.3 grams of elemental platinum per 100 grams of support.

Catalyst B3 was prepared by adding platinum to catalyst B1 containing nickel by dry impregnation in an aqueous medium using chloroplatinic acid $H_2PtCl_6.nH_2O$ as a precursor. After dry impregnation, the extrudates were dried overnight at 80° C. then calcined in dry air for 2 hours at 500° C. Catalyst B3 obtained contained 1.2 platinum atoms per $nm^2$ of support surface and 0.5 nickel atoms per $nm^2$ of support surface, i.e., 9.3 grams of platinum element per 100 grams of support and 1.17 grams of nickel element per 100 g of support. The molar proportion of nickel with respect to the total of nickel and platinum was 0.3. The catalyst thus contained the combination $Ni_{0.3}Pt_{0.7}$.

The catalysts prepared as above were sulphurised in a fixed bed reactor swept with a stream of gas containing 15% of $H_2S$ in hydrogen at atmospheric pressure. 2 liters per hour of mixture was passed per 5 g of catalyst and the catalyst was heated to a temperature of 400° C. for 10 hours. This sulphurisation was termed S2.

EXAMPLE 4
Preparation of Catalysts Containing Ru and V (In Accordance with the Invention)

We produced a series of catalysts containing ruthenium alone and vanadium and ruthenium supported on the support described in Example 1. Catalyst C1 was prepared by adding ruthenium to the extruded support by dry impregnation in an aqueous medium using ruthenium chloride $RuCl_3.nH_2O$ as a precursor. After dry impregnation, the extrudates were dried overnight at 80° C. without calcining. Catalyst C1 obtained contained 1.2 ruthenium atoms per $nm^2$ of support surface, i.e., 4.83 grams of elemental ruthenium per 100 grams of support.

Catalyst C2 was prepared by adding ruthenium to catalyst A1 containing vanadium by dry impregnation in an aqueous medium using ruthenium chloride $RuCl_3.nH_2O$ as a precursor. After dry impregnation, the extrudates were dried overnight at 80° C. without calcining. Catalyst C2 obtained contained 1.2 ruthenium atoms per $nm^2$ of support surface and 0.5 vanadium atoms per $nm^2$ of support surface, i.e., 4.83 grams of elemental ruthenium and 1.02 grams of elemental vanadium per 100 g of support. The molar proportion of vanadium with respect to the total of vanadium and ruthenium was 0.3. The catalyst thus contained the combination $V_{0.3}Ru_{0.7}$.

The catalysts prepared as above were sulphurised in a fixed bed reactor swept with a stream of gas containing 15% of $H_2S$ in hydrogen at atmospheric pressure. 2 liters per hour of mixture was passed per 5 g of catalyst and the catalyst was heated to a temperature of 400° C. for 10 hours.

EXAMPLE 5
NiMo and CoMo Catalysts (Comparative)

We added molybdenum to the extruded support of Example 1 by dry impregnation with an aqueous medium. The molybdenum salt was ammonium heptamolybdate $Mo_7O_{24}(NH_4)_6.4H_2O$. After dry impregnation, the extrudates were dried overnight at 120° C. then calcined at 350° C. for 2 hours in moist air containing 7.5% by volume of water. We then added nickel to the support impregnated with molybdenum by dry impregnating with an aqueous nickel nitrate medium $Ni(NO_3)_2.6H_2O$. After dry impregnation, the extrudates were dried overnight at 120° C. then calcined at 550° C. for 2 hours in moist air containing 7.5% by volume of water. The final molybdenum content of catalyst D1 was 1.2 atoms of molybdenum per $nm^2$ of support surface and 0.5 nickel atoms per $nm^2$ of support surface, i.e., 4.58 g of elemental molybdenum and 1.17 grams of elemental nickel per 100 g of support. The molar proportion of nickel with respect to the total of nickel and molybdenum was 0.3. The catalyst thus contained a combination $Ni_{0.3}Mo_{0.7}$.

The CoMo catalyst, D2, was obtained by dry impregnation of the support of Example 1 with an aqueous medium of ammonium heptamolybdate $Mo_7O_{24}(NH_4)_6.4H_2O$. After dry impregnation, the extrudates were dried overnight at 120° C. then calcined at 350° C. for 2 hours in moist air containing 7.5% by volume of water. We then added cobalt to the support impregnated with molybdenum by dry impregnating with an aqueous cobalt nitrate medium $Co(NO_3)_2.6H_2O$. After dry impregnation, the extrudates were dried overnight at 120° C. then calcined at 550° C. for 2 hours in moist air containing 7.5% by volume of water. The final molybdenum content of catalyst D2 was 1.2 atoms of molybdenum per $nm^2$ of support surface and 0.5 cobalt atoms per $nm^2$ of support surface, i.e., 4.58 g of elemental molybdenum and 1.17 grams of elemental cobalt per 100 g of support. The molar proportion of cobalt with respect to the total of cobalt and molybdenum was 0.3. The catalyst thus contained a combination $Co_{0.3}Mo_{0.7}$.

The catalysts prepared as above were sulphurised in a fixed bed reactor swept with a stream of gas containing 15% of $H_2S$ in hydrogen at atmospheric pressure. 2 liters per hour of mixture was passed per 5 g of catalyst and the catalyst was heated to a temperature of 400° C. for 10 hours.

EXAMPLE 6
Dibenzothiophene HDS Test

The catalysts described above were compared in a dibenzothiophene hydrodesulphuration test in a traversed fixed bed hydrogen pressurised reactor under the following operating conditions:

| | |
|---|---|
| Total pressure | 6 MPa |
| Hourly space volume | 6 $h^{-1}$ |
| Temperature | 250° C. |
| Hydrogen flow rate | 450 l/l of feed |

The catalytic performances are given in Table 3 below. They are expressed as the relative activity with respect to the specific activity in moles of DBT converted per g of catalyst per hour of the catalyst with reference B1.

TABLE 3

Activity of catalysts for dibenzothiophene hydrodesulphuration

| Catalyst | Metals | HDS of DBT, relative activity |
|---|---|---|
| A1 | V | 1.5 |
| A2 | Pd | 12 |
| A3 | V-Pd | 5 |
| B1 | Ni | 1 |
| B2 | Pt | 10 |
| B3 | Ni-Pt | 90 |
| C1 | Ru | 100 |
| C2 | V-Ru | 130 |
| D1 | Ni-Mo | 50 |
| D2 | Co-Mo | 65 |

The promotion effect prediction of rule n°1 for heats of formation or of rule n°2 for mean bond energies between the metal and sulphur are given in Table 4 below, which also shows values for Ru.

TABLE 4

| Ref | Metals | Rule n°1 heat of formation | | | Rule n°2 M—S bond energy | | |
|---|---|---|---|---|---|---|---|
| | | Promotion effect | -ΔH°f kcal/mol | kJ/mol | Promotion effect | $E_{M-S}$ kcal/mol | kJ/mol |
| A3 | $V_{0.5}Pd_{0.5}$ | yes | 42.5 | 178 | no | — | — |
| B3 | $Ni_{0.3}Pt_{0.7}$ | no | — | — | yes | 51.1 | 213.9 |
| C2 | $V_{0.3}Ru_{0.7}$ | no | — | — | yes | 48.2 | 201.8 |
| D1 | $Ni_{0.3}Mo_{0.7}$ | yes | 51.22 | 215 | yes | 53.9 | 225.6 |
| D2 | $Co_{0.3}Mo_{0.7}$ | yes | 54.4 | 228 | yes | 54.6 | 228.5 |
| C1 | Ru | | 49.2 | 206 | | 50.5 | 211.3 |

It can be seen that according to the mean heats of formation rule n°1, a combination of vanadium and palladium should have a promotional effect which is not observed in Table 3. In contrast, the mean bond energies rule n°2 predicts the absence of a promotional effect.

The combination of nickel and platinum and vanadium and ruthenium should not give a promotional effect according to mean heats of formation rule n°1. In contrast, the mean bond energies rule n°2 predicts a promotional effect which is in fact observed in Table 3. This shows that rule n°2 concerning the mean energy of the bond between the metal and sulphur is better for predicting the metal combinations which will result in a promotional effect for hydrodesulphuration than rule n°1. In particular, rule n°2 can successfully define very active combinations of elements in the form of mixed sulphides for hydrotreatment reactions.

Table 3 also shows that the novel formulae obtained can be more active than the catalyst containing ruthenium but in particular they can be more active than nickel-molybdenum, nickel-tungsten or cobalt-molybdenum combinations which are in widespread industrial use.

EXAMPLE 13

Catalyst Gas Oil HDS Test

The eight catalysts described above were also compared in a gas oil hydrodesulphuration test, the principal characteristics of the gas oil being shown in the following table:

| | |
|---|---|
| Density at 15° C. | 0.856 |
| Refractive index at 20° C. | 1.4564 |
| Viscosity at 50° C. | 3.72 cSt or 3.72 × 10⁶ m²/s |
| Sulphur | 1.57% by weight |
| Simulated distillation | |
| 1P | 153° C. |
| 5% | 222° C. |
| 50% | 315° C. |
| 95% | 415° C. |
| EP | 448° C. |

The gas oil HDS test was carried out under the following operating conditions:

| | |
|---|---|
| Total pressure | 3 MPa |
| Hourly space volume | 2 h⁻¹ |
| Temperature | 340° C. |
| Hydrogen flow rate | 250 l/l of feed |

Each catalyst was sulphurised before the test using a gas oil/DMDS mixture at up to 350° C.

The catalytic performances of the three catalysts are shown in Table 5 below. They are expressed as the activity, assuming that that of catalyst C1 is equal to 1 and considering them to be of order 1.5 The relationship connecting activity and conversion (% HDS) is as follows:

$$\text{Activity} = \left[\frac{100}{100 - \% HDS}\right]^{0.5} - 1$$

TABLE 5

| Ref | Metals | HDS GO relative activity |
|---|---|---|
| A1 | V | 1 |
| A2 | Pd | 4 |
| A3 | V-Pd | 2 |
| B1 | Ni | 1 |
| B2 | Pt | 1.5 |
| B3 | Ni-Pt | 4.5 |
| C1 | Ru | 4 |
| C2 | V-Ru | 4.2 |
| D1 | Ni-Mo | 3.5 |
| D2 | Co-Mo | 3.8 |

In the gas oil hydrodesulphuration test, the catalyst containing the V—Pd combination was active but did not show a positive effect when V and Pd were combined in accordance with rule n°2 described in the test, in contrast to that predicted by rule n°1. Combinations of metals in a mixed sulphide phase which satisfy rule n°2 regarding mean bond energies are thus of great importance.

What is claimed is:

1. A catalyst comprising a porous matrix and a mixed sulphide comprising at least two metals selected from the group consisting of metals having the following atomic numbers: 3, 11, 12, 19 to 33, 37 to 51, 55 to 83, 87 to 103, characterized in that said mixed sulphide results from a combination of at least one metal the sulphide of which has a bond energy between the metal and sulphur of less than 50±3 kcal/mol (209±12 kJ/mol) and at least one metal the sulphide of which has a bond energy between the metal and sulphur of more than 50±3 kcal/mol (209±12 kJ/mol), said mixed sulphide thus having a mean bond energy between the metal and sulphur which is in the range 30 to 70 kcal/mol. (125 to 293 kJ/mol) with the proviso that said metals are present in catalytic proportions which yield synergistically high hydrodesulfurization activities, and with the proviso that said mixed sulphide does not comprise any of a combination of sulphur and molybdenum-nickel and a combination of sulphur and molybdenum-cobalt.

2. A catalyst according to claim 1, also comprising a zeolite.

3. A catalyst according to claim 2, also comprising at least one element selected from the group consisting of elements P, B and Si.

4. A catalyst according to claim 3, comprising at least one element from group VIIA of the periodic table.

5. A process for hydrorefining or hydrocracking a hydrocarbon feed, comprising passing said hydrocarbon feed in contact with a catalyst according to claim 4 under hydrorefining or hydrocracking conditions at a temperature of more than 100° C. to treat or pre-treat the feed.

6. A catalyst according to claim 2, comprising at least one element from group VIIA of the periodic table.

7. A catalyst according to claim 1, also comprising at least one element selected from the group consisting of elements P, B and Si.

8. A catalyst according to claim 1, comprising at least one element from group VIIA of the periodic table.

9. A catalyst according claim 1, in which said mixed sulphide comprises at least one element selected from the group consisting of platinum, osmium, rhenium, ruthenium, tungsten, molybdenum, tantalum, niobium and titanium, and at least one element selected from the group consisting of palladium, nickel, cobalt, iron, rhodium, manganese, vanadium and chromium.

10. A catalyst according to claim 1, in which said mixed sulphide comprises at least one combination of sulphur and at least one of the following metal pairs:

platinum-palladium;
platinum-nickel;
platinum-cobalt;
platinum-iron;
platinum-rhodium;
platinum-manganese;
platinum-vanadium;
platinum-chromium;
platinum-ruthenium;
osmium-palladium;
osmium-nickel;
osmium-cobalt;
osmium-iron;
osmium-rhodium;
osmium-manganese;
osmium-vanadium;
osmium-ruthenium;
rhenium-palladium;
rhenium-nickel;
rhenium-cobalt;
rhenium-iron;
rhenium-rhodium;
rhenium-manganese;
rhenium-vanadium;
rhenium-chromium;
rhenium-ruthenium;
ruthenium-palladium;
ruthenium-nickel;
ruthenium-cobalt;
ruthenium-iron;
ruthenium-rhodium;
ruthenium-manganese;
ruthenium-vanadium;
ruthenium-chromium;
tungsten-palladium;
tungsten-nickel;
tungsten-cobalt;
tungsten-iron;
tungsten-rhodium;
tungsten-manganese;
tungsten-vanadium;
tungsten-chromium;
tungsten-ruthenium;
molybdenum-cobalt;
molybdenum-iron;
molybdenum-rhodium;
molybdenum-manganese;
molybdenum-vanadium;
molybdenum-chromium;
molybdenum-ruthenium;
tantalum-palladium;
tantalum-nickel;
tantalum-cobalt;
tantalum-iron;
tantalum-rhodium;
tantalum-manganese;
tantalum-vanadium;
tantalum-chromium;
tantalum-ruthenium;
niobium-palladium;
niobium-nickel;
niobium-cobalt;
niobium-iron;
niobium-rhodium;
niobium-manganese;
niobium-vanadium;
niobium-chromium;
niobium-ruthenium;
titanium-palladium;
titanium-nickel;
titanium-cobalt;
titanium-iron;
titanium-rhodium;
titanium-manganese;
titanium-vanadium;
titanium-chromium;
titanium-ruthenium;
iridium-palladium;
iridium-nickel;
iridium-cobalt;
iridium-iron;
iridium-rhodium;
iridium-manganese;
iridium-vanadium;
iridium-chromium;
iridium-ruthenium.

11. A process for hydrorefining or hydrocracking a hydrocarbon feed, comprising passing said hydrocarbon feed in contact with a catalyst according to claim 10 under hydrorefining or hydrocracking conditions at a temperature of more than 100° C. to treat or pre-treat the feed.

12. A catalyst according to claim 1, in which said mixed sulphide comprises at least one of the following pairs:

platinum-nickel;
ruthenium-vanadium.

13. A catalyst according to claim 12, in which said mixed sulphide does not contain a combination of sulphur and any of the following metals:

ruthenium-nickel;
ruthenium-cobalt;
tungsten-nickel;
tungsten-cobalt;
tungsten-iron;
molybdenum-iron;

molybdenum-vanadium;

niobium-nickel;

niobium-cobalt.

14. A catalyst according to claim 12, wherein said porous matrix comprises alumina.

15. A catalyst according to claim 1, in which said mixed sulphide does not comprise a combination of sulphur and any of the following metal pairs:

ruthenium-nickel;

ruthenium-cobalt;

tungsten-nickel;

tungsten-cobalt;

tungsten-iron;

molybdenum-iron.

16. A catalyst according to claim 1, in which the mean bond energy between the metal and sulphur in said mixed sulphide is in the range 35 to 65 kcal/mol (146 to 272 kJ/mol).

17. A catalyst according to claim 1, in which the mean bond energy between the metal and sulphur of said mixed sulphide is in the range 39 to 61 kcal/mol (163 to 255 kJ/mol).

18. A process for hydrorefining or hydrocracking a hydrocarbon feed, comprising passing said hydrocarbon feed in contact with a catalyst according to claim 1 under hydrorefining or hydrocracking conditions at a temperature of more than 100° C. to treat or pre-treat the feed.

19. A process according to claim 18, in which at least one of the following operations is carried out: hydrogenation, hydrodenitrogenation, demercurisation, dearsenification, hydrodeoxygenation, hydrodearomatisation, hydrodesulphuration, hydrodemetallisation, hydroisomerisation, hydrodealkylation, hydrogenolysis, dehydrogenation and hydrocracking of hydrocarbon feeds containing aromatic compounds and/or olefinic compounds and/or naphthenic compounds and/or paraffinic compounds.

20. A process according to claim 18, in which the feed comprises petroleum cuts used alone or as a mixture selected from the group consisting of gasolines, gas oils, vacuum gas oils, atmospheric residues, vacuum residues, atmospheric distillates, vacuum distillates, heavy fuels, oils, waxes and paraffins, spent oils, deasphalted crudes and residues, and feeds originating from thermal or catalytic conversion processes selected from the group consisting of cuts from coal, hydrocarbons produced from natural gas, and hydrocarbons produced from the Fischer-Tropsch synthesis.

21. A process according to any one of claims 18 to 20, in which said feeds comprise at least one heteroatom selected from the group consisting of sulphur, oxygen and nitrogen and at least one metal.

22. A process according to claim 18, in which the operating conditions are as follows: the temperature is over 100° C., the pressure is over 0.05 MPa, the hydrogen recycle ratio is a minimum of 50 normal liters of hydrogen per liter of feed and the hourly space velocity is in the range 0.1 to 20 volumes of feed per volume of catalyst per hour.

23. A process according to claim 18, in which the catalyst undergoes sulphurisation treatment to transform at least a portion of the metallic species into the sulphide before bringing them into contact with the feed to be treated.

24. A catalyst according to claim 1, wherein said porous matrix comprises alumina.

* * * * *